3,214,398
EMULSION PAINT COMPRISING TUNG OIL AND LEAD SILICATE

Wesley G. Vannoy, Wilmington, Del., assignor to E. I. du Pont de Nemours and Company, Wilmington, Del., a corporation of Delaware
No Drawing. Filed June 19, 1961, Ser. No. 117,804
2 Claims. (Cl. 260—23)

This invention relates to a new and improved paint composition. More particularly, it relates to a paint composition having particular utility for the painting of wooden structures composed of red celar and redwood.

Red cedar and redwood structures, such as red cedar shakes, shingles and clapboards are of great utility as exterior surface structures on buildings. Red cedar, however, contains a brown water-soluble stain that has an obnoxious tendency to bleed through paint coatings.

Water-base emulsion or latex paints have, in recent years, become of oustanding importance as exterior paints because of certain well-known advantages over oil-base paints. Such water-base paints, for example, water emulsions of vinyl acetate homopolymer and copolymers, acrylic emulsion paints containing, typically, a water emulsion of a copolymer of ethyl acrylate, methyl methacrylate and methacrylic acid, or a water emulsion of copolymerized styrene, ethyl hexyl acrylate, acrylonitrile and methacrylic acid, despite their excellent hiding qualities, have been subject to red cedar staining because of the water base of such paints.

It is an object of this invention to provide water-base emulsion paints that are resistant to red cedar staining.

It is a further object to provide a combination of additives for water-base emulsion paints that will make such paints resistant to red cedar staining.

Other objects may be apparent from the description that follows.

The objects may be accomplished, in general, by the inclusion of a water-base emulsion paint of .75 to 3 lbs./gal. of basic silicate of white lead and 10% to 30% by volume of tung oil.

Although basic silicate of white lead has some effect, as an ingredient in exterior water-base emulsion paints, to prevent red cedar staining and tung oil, likewise, has some slight effect as a red cedar staining retardant, it has now been discovered that only when the tung oil and basic silicate of white lead are both in a water-base emulsion primer that red cedar staining is completely prevented.

Exterior paints are usually applied to wooden structures in at least two coats, i.e., a primer coat and at least one topcoat. It is only necessary, in accordance with this invention, to add the basic silicate of white lead to the base or primer coat, but many, if desired, be present in both coats.

By the term basic silicate of white lead is meant the product $2PbO \cdot SO_3 + 2PbO \cdot SiO_2$ described in the article, entitled "A New Pigment Concept," by F. J. Williams and A. R. Pitrot on page 1948 of vol. 40, Ind. Eng. Chem. (1948), and containing, by weight, about 47.9% PbO, 47.9% $SiO_2$ and 4.2% $SO_3$, as well as the Eagle-Pitcher Basic Silicate of white lead No. 202 containing PbO, 83–85%, and $SiO_2$, 14–16%.

The following examples of polyvinyl acetate water-base emulsion paints prepared in accordance with the present invention and containing basic silicate of white lead and tung oil in the required amount and comparative examples of similar compositions containing only tung oil or only basic silicate of white lead are tabulated hereinbelow.

For use in the comparative examples, the following basic paint formulations were used.

PAINT FORMULATION NO. 1 IN LBS./100 GALS.

Pigment grind:
```
    Water _____ 135
    "Daxad" 30, a dispersing agent consisting of the
        sodium salt of a polyelectrolyte _____   5
    Mica, 325 mesh water ground _____  30
    Chalk resistant rutile titanium dioxide _____ 200
    Magnesium silicate extender pigment _____  61
    Free chalking anatase titanium dioxide _____  50
```
Reducing additives:
```
    2% aqueous solution of hydroxyethyl cellu-
        lose _____ 150
    Propylene glycol monococate "C" anti-foaming
        agent of fatty acid ester of propylene
        glycol _____   2
    As a surface active agent, "Witco" 912, an
        anionic-nonionic blend to polyoxyethylene
        esters of mono- and dicarboxylic acids plus
        oil-soluble sulfonates _____   4
    Water _____  96
    Diethylene glycol monoethyl ether _____  30
    Aqueous emulsion, 54–56% solid by weight, of
        the copolymer obtained by the polymerization
        of 85 weight percent vinyl acetate and 15
        weight percent dibutyl maleate _____ 344
    "Igepal" CA–630, a dispersing agent composed
        of nonylphenoxypoly(ethyleneoxy)ethanol __   2
    Phenyl mercuric acetate 30% solution _____   8
```
Tung oil reducer formula (add 1 qt./gal.):
```
    Raw tung oil _____ 100
    "Makon" 10, dispersing agent, alkyl phenoxy
        polyoxyethylene ethanol _____ 2.5
    Lead naphthenate, 24% Pb drier _____ 1.5
    Cobalt naphthenate, 6Z Co drier _____ 0.5
    Phenyl mercuric oleate, 10% Hg mildew in-
        hibitor _____ 3.5
```

Paint properties:
```
    Total volume _____ gal____    100
    Pigment volume concentration ____percent__     35
    Non-volatiles (by weight) _____do____   48.8
    Pounds/gal. _____   11.1
    Consistency (Krebs units) _____  73–78
    pH _____    6–7
```

PAINT FORMULATION NO. 2 IN LBS./100 GALS.

Pigment grind:
```
    Water _____ 205
    "Daxad" 30 _____   5
    Mica 325 mesh _____  30
    TiO_2 (rutile) _____ 175
    TiO_2 (anatase) _____  50
    Basic silicate of white lead _____ 100
    Magnesium silicate extender pigment _____  20
```

Reducing additives:
- 2% aqueous hydroxyethyl cellulose _____ 150
- Propylene glycol monococate "C" anti-foaming agent _____ 2
- "Witco" 912, surface active agent _____ 4
- Water _____ 25
- Diethylene glycol monoethyl ether _____ 30
- Aqueous emulsion, 54–56% solids by weight, of the copolymer obtained by the polymerization of 85 wt. percent vinyl acetate and 15 wt. percent dibutyl maleate _____ 340
- Phenyl mercuric acetate, 30% solution _____ 8
- "Igepal" CA-630 _____ 2
- (Add 1 qt./gal. of tung oil reducer formula.)

Paint properties:
- Total volume _____ gal__ 100
- PVC _____ percent__ 34
- Non-volatiles (by weight) _____ do____ 50
- Pounds/gal. _____ 11.55
- Consistency (Krebs units) _____ 69
- pH _____ 6.1

PAINT FORMULATION NO. 3 IN LBS./100 GALS.

Pigment grind:
- Water _____ 80
- "Polyglycol" P-1200, polypropylene glycol (mol. wt. 1200) _____ 2
- "Tamol" 731, 25% soln., sodium salt of polymeric carboxylic acid _____ 6
- "Emulphor" EL-719, polyoxyethylated vegetable oil _____ 3
- "Carbitol," diethylene glycol monoethyl ether __ 35
- Dibutyl phthalate _____ 30
- Mica, 325 mesh waterground _____ 30
- Chalk resistant rutile $TiO_2$ _____ 150
- Basic silicate of white lead _____ 150

Reducing additives:
- Methyl cellulose, 2% aqueous solution _____ 160
- Water _____ 109
- Polyvinyl acetate emulsion _____ 360
- Phenyl mercury acetate, 10% solution _____ 15
- (Add 1 qt./gal. of tung oil reducer formula)

The above paint formulations were used in carrying out exposure tests conducted with red cedar clapboards and shingles. The clapboards and panels were coated with two coats of paint of the number tabulated. Some panels were painted without either basic silicate of white lead or tung oil and some with only the lead or the tung oil and some with both ingredients in the paint in the quantities specified. On clapboard, all primer coats were painted with a coating of 550 sq. ft. per gal. and all top coats with 650 sq. ft. per gal. On shakes all primer coats were painted with a coating of 200 sq. ft. per gal. and all top coats with 300 sq. ft. per gallon. In some cases, one or both of the basic silicate of white lead and tung oil were contained in the primer coating and/or the top coating. All of the paints of the examples have a pigment volume concentration of 34–35.

The ratings of the panels before exposure, after exposures of one, four and eight weeks are tabulated as severe, moderate, slight or none. By "severe" is meant a readily discernable brown streaking. By "moderate" is meant a readily discernable tan coloration. By "slight" is meant a barely noticeable coloration and by "none" is meant no noticeable coloration by comparison with a panel similarly coated on a non-staining surface.

In the following examples "BSWL" referes to basic silicate of white lead and the amount of the latter is given in lbs./gallon. The tung oil, where present in the examples, is in all cases present in an amount of one quart per gallon.

*Table No. I*

EXPOSURE TESTS ON CEDAR SHAKES—STAINING RESULTS

| Ex. No. | Primer | | | Topcoat, BSWL, Amt. | Staining Results | | | |
|---|---|---|---|---|---|---|---|---|
| | BSWL, Amt. | Paint Formulation No. | Reducer | | Initial | 1 Week | 4 Weeks | 8 Weeks |
| 1 | 0 | 1 | 0 | 0 | Severe | Severe | Severe | Severe. |
| 2 | 0 | 1 | Tung Oil | 0 | ___do___ | ___do___ | ___do___ | Do. |
| 3 | 1.0 | 2 | 0 | 0 | Slight | Moderate | Moderate | Moderate. |
| 4 | 1.0 | 2 | Tung Oil | 0 | None | None | None | None. |
| 5 | 1.5 | 2 | 0 | 0 | ___do___ | Moderate | Slight | Slight. |
| 6 | 1.5 | 2 | Tung Oil | 0 | ___do___ | None | None | None. |
| 7 | 1.0 | 2 | 0 | 1.0 | ___do___ | Moderate | Slight | Slight. |
| 8 | 1.0 | 2 | Tung Oil | 1.0 | ___do___ | None | None | None. |

*Table No. II*

EXPOSURE TESTS ON RED CEDAR CLAPBOARD—STAINING RESULTS

| Ex. No. | Primer | | | Topcoat, BSWL, Amt. | Staining Results | | | |
|---|---|---|---|---|---|---|---|---|
| | BSWL, Amt. | Paint Formulation No. | Reducer | | Initial | 1 Week | 4 Weeks | 8 Weeks |
| 9 | 0 | 2 | | 0 | Severe | Severe | Moderate | Slight. |
| 10 | 0 | 2 | Tung Oil | 0 | Moderate | ___do___ | Severe | Severe. |
| 11 | 1.0 | 2 | | 0 | Slight | Moderate | Moderate | Moderate. |
| 12 | 1.0 | 2 | Tung Oil | 0 | None | None | None | None. |

EXAMPLE 13

Red cedar shingles painted with two coats of paint formulation No. 3, containing both BSWL and tung oil, fail to show noticeable staining either initially or after outdoor exposure to the atmosphere for 8 weeks. Upon omitting either tung oil or BSWL from the paint formulation and painting similar red cedar shingles a very noticeable staining results after 4 weeks' exposure. Upon omitting both BSWL and tung oil, very severe staining results after 1 week's exposure.

Since it is obvious that many changes and modifications can be made in the above-described details without departing from the nature and spirit of the invention, it is to be understood that the invention is not to be limited to said details except as set forth in the appended claims.

I claim:

1. An aqueous emulsion paint of the group consisting of polyvinyl acetate emulsion paints and vinyl acetate/dibutyl maleate copolymer emulsion paints, which aqueous emulsion paint contains therein, in combination, as agents to prevent red cedar staining: (a) 0.75 to 3 lbs. per gallon of a basic silicate of white lead of the group consisting of such a silicate containing about 47.9% PbO, 47.9% $SiO_2$ and 4.2% $SO_3$ by weight, and such a silicate containing 83 to 85% PbO and 14 to 16% $SiO_2$ by weight; and (b) 10 to 30% by volume of tung oil.

2. An aqueous polyvinyl acetate emulsion paint containing, in combination, as agents to prevent red cedar staining: (a) 0.75 to 3 lbs. per gallon of a basic silicate of white lead of the group consisting of such a silicate containing about 47.9% PbO, 47.9% $SiO_2$ and 4.2% $SO_3$ by weight, and such a silicate containing 83 to 85% PbO and 14 to 16% $SiO_2$ by weight; and (b) 10 to 30% by volume of tung oil.

References Cited by the Examiner
UNITED STATES PATENTS

| | | | |
|---|---|---|---|
| 2,346,188 | 4/44 | Robertson | 106—297 |
| 2,391,118 | 12/45 | Barton | 106—297 |
| 2,477,277 | 7/49 | Williams | 106—297 |
| 3,033,808 | 5/62 | Murray et al. | 260—23 |

LEON J. BERCOVITZ, *Primary Examiner.*

MILTON STERMAN, *Examiner.*